United States Patent [19]
Russett

[11] Patent Number: 5,887,509
[45] Date of Patent: Mar. 30, 1999

[54] DEEP FAT FRYER

[75] Inventor: Jon P. Russett, Beloit, Wis.

[73] Assignee: Keating of Chicago, Inc., Bellwood, Ill.

[21] Appl. No.: 164,560

[22] Filed: Oct. 1, 1998

[51] Int. Cl.$^6$ .............................. A47J 37/00; A47J 37/12
[52] U.S. Cl. ............................... 99/330; 99/403; 99/408; 126/378; 126/391
[58] Field of Search .............................. 99/330, 331–336, 99/403, 407–409, 410–415, 325, 327, 328; 126/378, 390, 391; 210/167, DIG. 8; 219/492, 494, 497, 442; 364/400, 528.34, 528.35, 528.41; 426/233, 417, 438

[56] References Cited

U.S. PATENT DOCUMENTS

| | | | |
|---|---|---|---|
| 2,452,472 | 10/1948 | Keating | 126/391 |
| 3,722,498 | 3/1973 | Kimbrough | 99/403 X |
| 3,760,793 | 9/1973 | Anetsberger et al. | 126/391 |
| 4,210,123 | 7/1980 | Moore et al. | 99/330 X |
| 4,397,299 | 8/1983 | Taylor et al. | 126/391 |
| 4,444,095 | 4/1984 | Anetsberger et al. | 99/330 X |
| 4,481,873 | 11/1984 | Keating | 99/403 |
| 4,599,990 | 7/1986 | Fritzsche et al. | 210/167 X |
| 4,602,612 | 7/1986 | Schwizer | 126/390 X |
| 4,668,390 | 5/1987 | Hurley et al. | 210/167 |
| 4,684,412 | 8/1987 | Fritzsche | 99/408 X |
| 4,722,267 | 2/1988 | Galockin et al. | 99/407 X |
| 4,751,915 | 6/1988 | Price | 126/391 |
| 4,848,318 | 7/1989 | Brewer | 126/390 |
| 4,913,041 | 4/1990 | Taber et al. | 99/403 |
| 4,945,893 | 8/1990 | Manchester | 99/403 X |
| 5,253,566 | 10/1993 | McCabe et al. | 99/403 |
| 5,706,717 | 1/1998 | Barner | 99/330 |

*Primary Examiner*—Timothy F. Simone
*Attorney, Agent, or Firm*—Nicholas A. Camasto

[57] ABSTRACT

A deep fat fryer includes a housing having a door and a removable access panel that shields a frypot, one or more gas burners and gas and air regulators. A control panel supports user controls and includes vents for channeling air over the user controls during burner operation. A drain valve for emptying the contents of the frypot extends through an orifice in the access panel and has a handle that prevents closure of the door unless the drain valve is fully closed. The blower version of the gas burner includes a removable restrictor plate for determining the heat characteristics thereof.

11 Claims, 3 Drawing Sheets

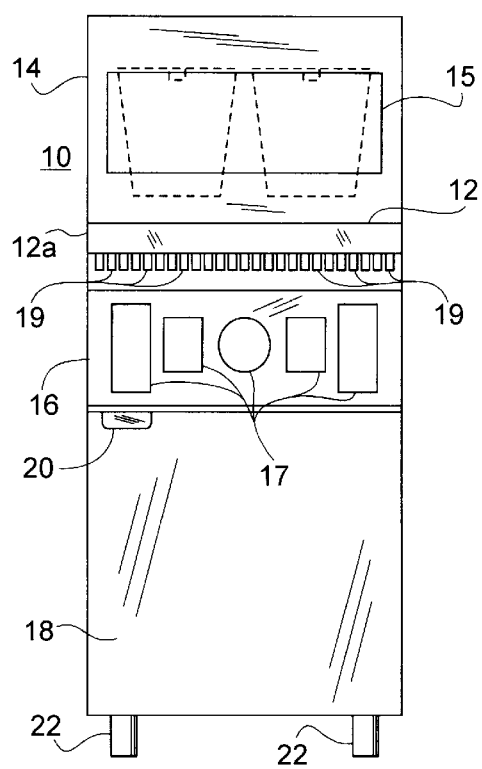
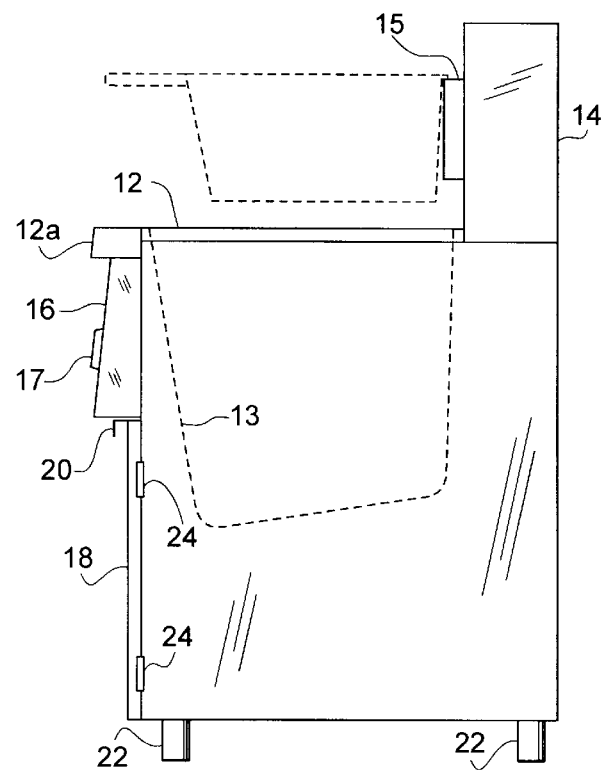
FIG. 1
FIG. 2
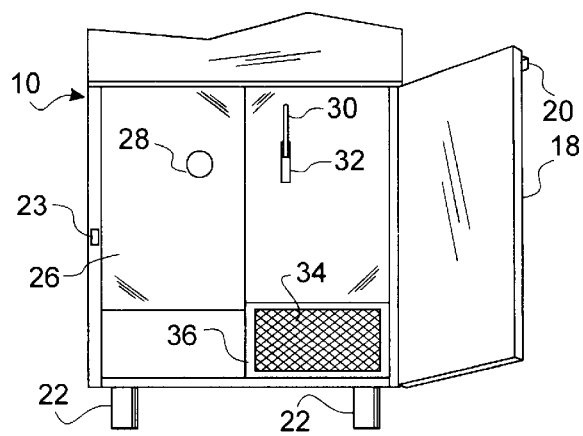
FIG. 3
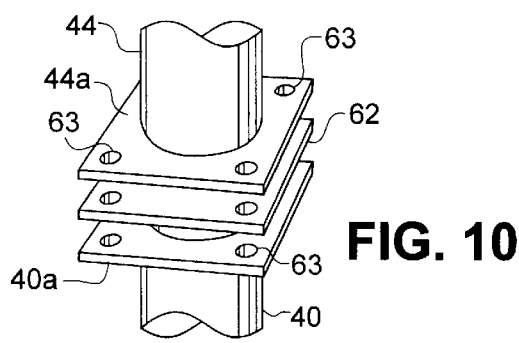
FIG. 10
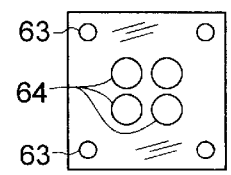
FIG. 11

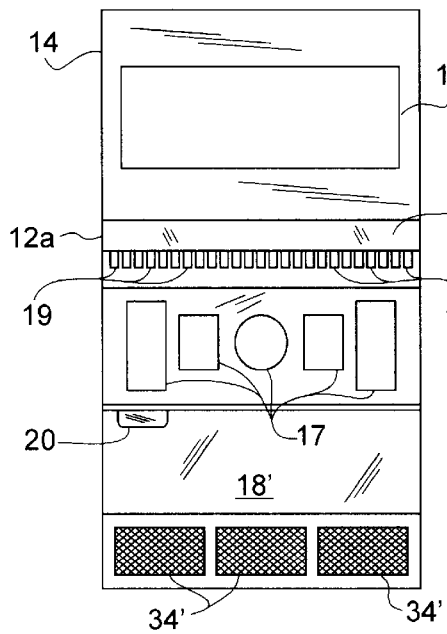
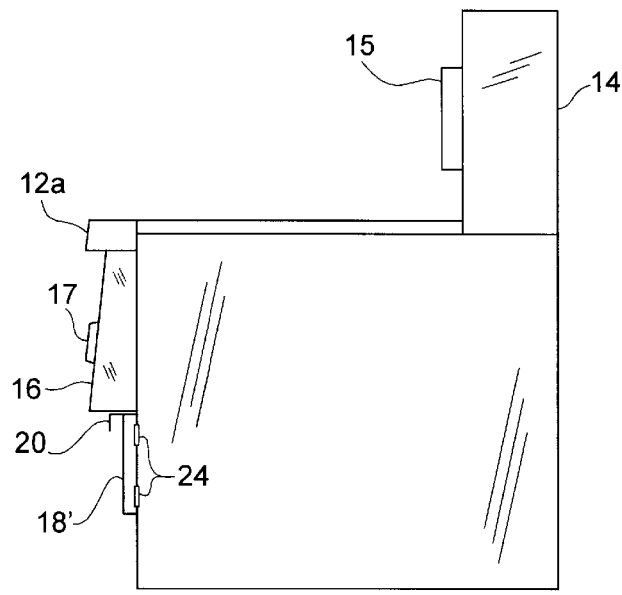
FIG. 4       FIG. 5
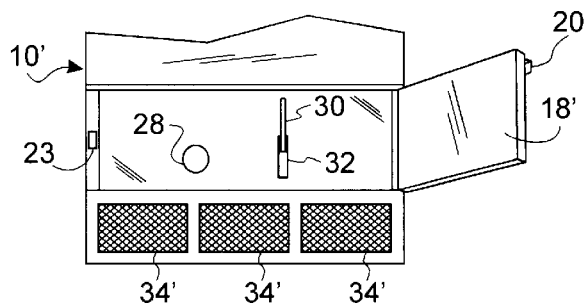
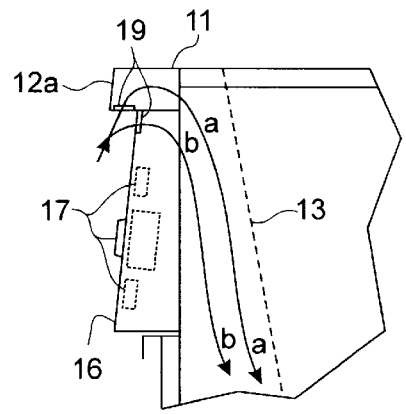
FIG. 6       FIG. 7
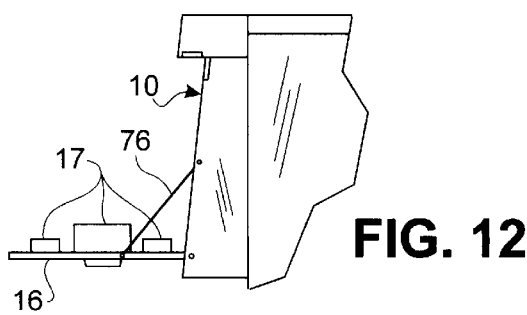
FIG. 12

DEEP FAT FRYER

BACKGROUND OF THE INVENTION AND PRIOR ART

This invention relates generally to Deep Fat Fryers and particularly to a novel Deep Fat Fryer design that is useful for different types of fryers and fryer sizes and should consequently prove less costly to manufacture. The design of the fryer makes for easier operation, enhanced cleanability and more efficient operation.

Deep fat fryers, such as those employed in restaurants, are well-known in the art and generally include a frypot for containing a cooking medium, such as oil, one or more wire baskets for supporting foodstuffs in the cooking medium, means for heating the cooking medium and various user controls for establishing different cook cycles. These controls generally comprise a timer, a temperature control, various indicating and status lights and alarms, etc. The fryer also includes a drain to permit removal of the cooking medium when it becomes contaminated. It is common to use gas burners, including atmospheric burners and blower powered gas burners that have infrared (IR) heating elements, in conjunction with microprocessor-controlled gas flow valves, for supplying heat to the cooking medium and providing temperature control for cooking various foodstuffs in the baskets in accordance with the user-established cook cycle. A manufacturer, such as the Assignee of the present invention, Keating of Chicago, Inc., generally produces a line of deep flat fryers that includes fryers of different size and capacity. A fryer with a large frypot may, for example have from three to six heat tubes positioned in the frypot, with a number of burner units for supplying heat, via combustion products, to the heat tubes.

Commonality of parts is a major factor for a manufacturer in controlling costs and production procedures and in one aspect the present invention design incorporates a modular IR burner/blower combination and a replaceable restrictor plate for changing the heat characteristics of the combination and enabling use of one or more of the modular burner/blowers among a variety of different size and capacity fryers.

Burner and heat transfer efficiency are important to both user and manufacturer; an inefficient design costing more in time and energy for the user, and entailing the need for more robust and complex fuel delivery and exhaust systems for the manufacturer. Servicing of the fryers is also an important consideration and a feature of the present invention design, enables service or adjustment of the gas flow valves, burner/blower combinations and air flow control devices to be accomplished with access only to the front of the fryer and without significant disassembly. In a further aspect the fryer is maintained in a clean state, with the air supplied to the burners being filtered and with the internal working parts of the fryer being substantially sealed from the environment. This has a salutary effect on equipment operation, since there is less likelihood of electrical and mechanical breakdown when the equipment is relatively free of grease, dirt, debris, etc.

OBJECTS OF THE INVENTION

A principal object of the invention is to provide an improved efficiency deep fat fryer.

Another object of the invention is to provide a more readily serviceable deep fat fryer.

A further object of the invention is to provide a deep fat fryer that uses a modular IR burner/blower combination for a wide variety of fryer sizes and heat capacities.

A still further object of the invention is to provide a fryer, the working mechanism of which is substantially isolated from the environment.

BRIEF DESCRIPTION OF THE DRAWINGS

These and other objects and advantages of the invention will be apparent upon reading the following description in conjunction with the drawings in which:

FIG. 1 is a front view of a free-standing deep fat fryer of the invention;

FIG. 2 is a side view of the fryer of FIG. 1;

FIG. 3 is a partial perspective view of the fryer of FIG. 1, with the door open;

FIG. 4 is a front view of a counter top version of the fryer of the invention;

FIG. 5 is a side view of the fryer of FIG. 4;

FIG. 6 is a partial perspective view of the fryer of FIG. 4 with the door open;

FIG. 7 is a partial schematic view of the fryer of the invention illustrating air flow over the user controls;

FIG. 10 illustrates the replaceable restrictor plate used with the burners of the invention;

FIG. 11 illustrates one of the many forms of restrictor plate that are useful with the invention; and FIG. 12 shows the tilt out control panel in its servicing position.

DESCRIPTION OF THE PREFERRED EMBODIMENT

Figure 8:
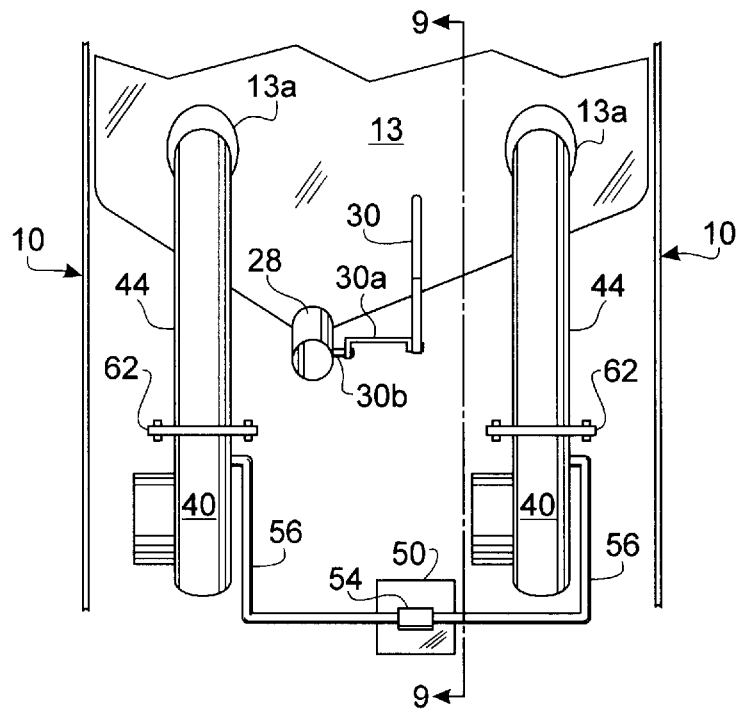
FIG. 8 is a partial front view of a fryer of the invention with the access panel removed.

Referring generally to FIGS. 1–3, the free-standing fryer of the invention includes a housing 10 having a top surface 12 with an overhang 12*a*, a frypot 13 (in dashed lines), a back splash 14, a control panel 16 supporting a plurality of user controls and indicators 17, a door 18 with a door pull 20 and a plurality of legs 22. A basket hanger 15 is mounted on back splash 14 for supporting one or more conventional wire foodstuff cooking baskets (shown in dashed lines). Door 20 is swingably supported on a pair of hinges 24 and, when opened, exposes a removable access panel 26 through which a drain valve 28 extends (via an orifice, not shown, in the access panel). It will be appreciated that the housing interior is substantially closed to the surrounding atmosphere. Therefore the sides, back and bottom of housing 10 should be understood to seal its interior so that the vast majority of air for the burners must pass through a filter. In this regard, a plurality of vents 19 are formed along the upper portion of control panel 16 (and the underside of overhang 12*a*) for channeling some air over the front of frypot 13 and user controls 17 when the burners are operating. Not only does this help remove heat from the heat generating user controls, but it also preheats some of the air that flows to the burners, thus adding to the fryer efficiency.

Figure 9:
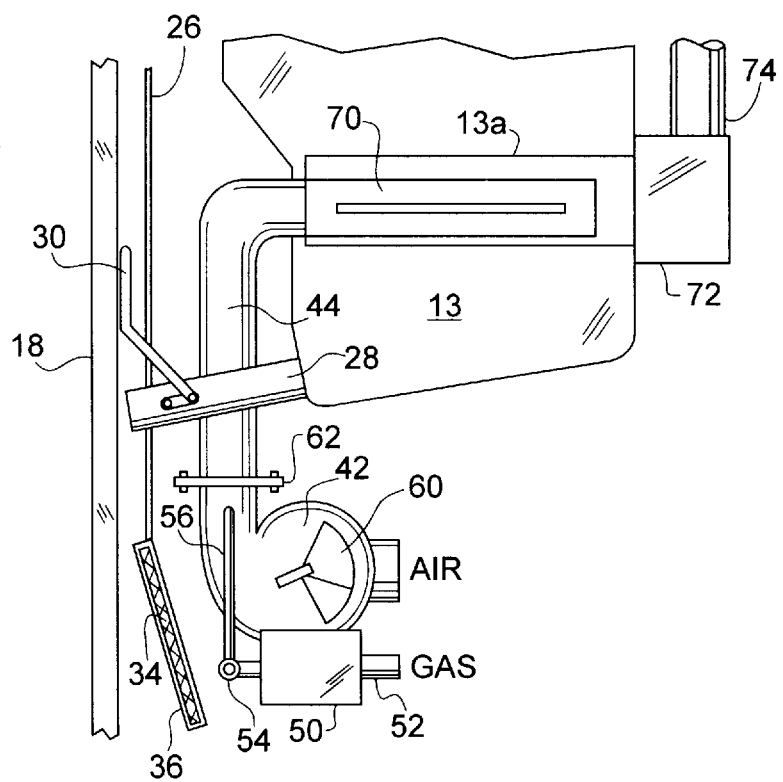
FIG. 9 is a sectional view taken along line 9—9 of FIG. 8.

Drain valve 28 is opened and closed manually by means of an extended handle 30 which protrudes through a slot 32 in access panel 26. As is best seen in FIG. 9, handle 30 interferes with closure of door 20 unless drain valve 28 is fully closed to prevent inadvertent filling of frypot 13. The lower right-hand portion of access panel 26 is cut out and a removable, cleanable, filter 34, that is supported by a plurality of L-shaped channels 36, is installed therein. A magnetic catch 23 or the like is installed in the upright of housing 10 opposite hinges 24 for securing door 20 in a closed position.

FIGS. 4–6 are similar to FIGS. 1–3, except for minor differences due to the fryer being intended for countertop use, either without legs, or with very short legs. In most respects, the countertop fryer is the same as its free-standing counterpart except for a shorter door 20' and a row of filters 34' across the lower portion of housing 10'. Access panel 26' is arranged to accommodate the greater extent of the filters 34', which are also removable and cleanable.

FIG. 7 illustrates the action of vents 19 in control panel 16 and overhang 12a in channeling a flow of air over the front of frypot 13 and user controls 17 during operation of the burner. It will be appreciated that operation of the burner, whether atmospheric or blower driven, draws air into the interior of housing 10, mostly through the filter provided, since the housing is substantially sealed from outside air. However, some air will be drawn through vents 19 as illustrated for the purpose of cooling the user controls and preheating some of the air supplied to the burner.

FIGS. 8 and 9 illustrate a typical layout of a fryer constructed in accordance with the invention, with the access panel removed. In these figures two modular IR burner/blower combinations 40 are illustrated, but the figures are equally adaptable to an atmospheric burner installation and to installations that have a fewer or greater number of burners. The modular units 40 are coupled to individual mixer tubes 44 that supply corresponding heat tubes 13a with heat and combustion products. As best seen in FIG. 9, an IR burner 70 is positioned in heat tube 13a and combustion products therefrom are delivered to a plenum 72 and out a flue 74 that may be located inside of or behind the back splash. A removable restrictor plate 62 is coupled between each modular unit 40 and mixer tube 44. A gas valve and regulator 50 receives gas from an inlet pipe 52 and supplies it through a T connector 54 to a pair of pipes 56 that are coupled near the outputs of modular units 40, respectively. Air flow control is provided by a built in adjustable vane 60 in the blower housing 42 that modulates the amount of air being drawn into modular unit 40. In this free-standing version of the fryer, the lower portion of access plate 26 is angled backward slightly and supports filter 34 as shown.

Handle 30 is bolted or otherwise secured to an extension bracket 30a that is secured to the valve operating lever 30b. As best seen in FIG. 9, the forward edge of handle 30 abuts the inner surface of door 18 when drain valve 28 is fully closed. (Pulling handle 30 down in the figure opens drain valve 28.) It should be noted that fill operation of drain valve 28 is accomplished with less than 90° of movement of handle 30 so that the operator's hand is always above the opening in drain valve 28, which is a safety feature. It will also be noted that access to many of the parts of the fryer may be had for servicing by removal of air filter 34 without the need for removal of access panel 26. This is a time saving feature of the inventive design.

FIG. 10, shows the method of securing restrictor plate 62 between the output of modular unit 40 and mixer tube 44. Modular unit 40 has a flange 40a welded to its output end and a mating flange 44a is welded to the input end of mixer tube 44. Restrictor plate 62 is sandwiched between flanges 40a and 44a and the assembly is bolted together via mating holes 63 in the flanges and restrictor plate and suitable well-known fasteners (not shown). As shown in FIG. 11, restrictor plate 62 has a number of apertures 64 formed therein for changing the heating characteristics of the burner assembly. As discussed above, the number and size of the apertures in the restrictor plate should not be limited to that shown.

In FIG. 12, control panel 16 is shown tilted out for servicing ease. Control panel 16 may be conveniently hinged along its bottom edge and supported from housing 10 by means of one or more cables 76 secured between the control panel and the housing. Suitable latching means, not illustrated, is provided at the top of control panel 16 to securely maintain it in position when not being serviced.

To summarize, the inventive design provides for a relatively sealed housing so that the majority of air supplied to the burners passes through a readily accessible and cleanable filter. This keeps the fryer operating mechanism clean, which improves sanitation and reliability. The filter is supported in a removable access panel and permits servicing of many of the fryer parts without necessitating removal of the access panel. The control panel may also be tilted out to gain access to the user controls in the event servicing is required. A plurality of vents is provided along the top of the control panel to channel some air over the user controls and the front of the frypot during use. This not only keeps the controls cooler, but it preheats some of the air being supplied to the burners, thus improving fryer efficiency. It will be noted that the entire fryer is generally serviceable from the front, which is an important factor since the fryers are often installed in restaurant kitchens where space may be limited. The modular IR blower/burner combination with the replaceable restrictor plate enables a standardized blower/burner unit to be used over an entire line of the manufacturer's fryers, thus permitting uniformity of production procedures and minimizing inventories. Also, the drain valve handle is positioned to keep the user's hand away from any hot oil emanating from the drain valve and is further arranged such that the fryer door can not be closed unless the drain valve is fully closed.

What has been described is a novel deep fat fryer that is more efficient, uses a modular IR blower/burner with a restrictor plate that is applicable over an entire line of fryers, and is readily serviceable from the front. It is recognized that numerous changes to the described embodiment of the invention will be apparent without departing from its true spirit and scope. The invention is to be limited only as defined in the claims.

What is claimed is:

1. A deep fat fryer comprising:
   a housing including a control panel;
   a frypot in said housing for holding a quantity of a cooking medium;
   a heat tube in said frypot in communication with said cooking medium;
   a gas burner for supplying heat and combustion products to said heat tube;
   user control means on said control panel for establishing a cook cycle for said fryer, said user control means generating heat when in use;
   means for regulating the flow of gas to said gas burner responsive to said user control means during said cook cycle; and
   vent means for channeling air over said user control means on said control panel responsive to operation of said burner.

2. The fryer of claim 1, further including:
   an access panel shielding said frypot, said gas burner and said regulating means; and a removable air filter in said access panel, which when removed, permits said gas burner and said regulating means to be serviced with said access panel in place.

3. The fryer of claim 2, further comprising:

an openable door on said housing covering said access panel;

a drain valve for removing said cooking medium from said frypot, said drain valve projecting through an orifice in said access panel; and a handle for operating said drain valve with said access panel in place, said handle interfering with closure of said door unless said drain valve is fully closed.

4. The fryer of claim 3, further including:

means on said control panel for enabling said control panel to be tilted out for servicing of said user controls; and vent means in said control panel for channeling air for said burner over said user controls.

5. A deep fat fryer comprising:

a housing including an access panel;

a frypot in said housing for holding a quantity of a cooling medium;

a heat tube in said frypot in communication with said cooking medium;

a modular IR gas burner/blower combination, located behind said access panel, for supplying heat and combustion products to said heat tube;

flow means, located behind said access panel, for controlling the flow of air to said burner/blower combination;

user control means for establishing a cook cycle for said fryer;

microprocessor means for regulating gas flow to said burner/blower combination during said cook cycle; and air filter means in said access panel for filtering air supplied to said flow means.

6. The fryer of claim 5, further comprising:

a tilt down control panel for supporting said user control means and said microprocessor means;

user controls on said control panel for establishing said cook cycle, said user controls generating heat during operation; and a vent for channeling air over said user controls when said IR burner/blower combination is operating.

7. The fryer of claim 5, wherein said air filter means is removably supported in said access panel and permits servicing of said flow means, said regulating means and said modular burner/blower with said access panel in place.

8. The fryer of claim 5, further including:

a door on said housing for covering said access panel;

a drain valve, extending through said access panel for removing said cooking medium from said frypot; and a handle on said drain valve that, when in its open position, prevents closure of said door.

9. The fryer of claim 5 further including a removable restrictor plate in said modular IR burner/blower combination for tailoring the heat characteristics thereof.

10. An easily serviced, efficient modular deep fat fryer comprising:

a housing having a control panel, a door and a removable access panel;

a frypot in said housing for holding a quantity of cooking medium;

one or more heat tubes in said frypot in communication with said cooking medium;

one or more modular IR gas burner/blower combinations, located behind said access panel, for supplying heat and combustion products to said heat tubes;

flow means for adjusting the airflows to said IR gas burner/blower combinations;

a drain valve connected to said frypot for draining said cooking medium, said drain valve extending through an orifice in said access panel and having a handle that precludes closure of said door unless said drain valve is fully closed;

user controls, on said control panel for establishing temperature-time cycles for said cooking medium, said user controls generating heat when in use;

regulating means for controlling said modular IR gas burner/blower combinations responsive to said user controls;

a removable air filter in said access panel for filtering air for said flow means and for permitting servicing of said regulating means, said modular IR burner/blower combinations and said flow means with said access panel in place;

means for enabling said control panel to be tilted out for servicing; and a vent for channeling air over said user controls to said burner/blower combinations.

11. The fryer of claim 10, wherein each of said modular IR burner/blower combinations includes a removable restrictor plate for controlling the heat characteristics thereof.

* * * * *